United States Patent
Park et al.

(10) Patent No.: US 6,907,074 B2
(45) Date of Patent: *Jun. 14, 2005

(54) APPARATUS AND METHOD FOR PERFORMING MIXED MOTION ESTIMATION BASED ON HIERARCHICAL SEARCH

(75) Inventors: Seong-mo Park, Daejon (KR); Kyoung-seon Shin, Daejon (KR); Seong-min Kim, Daejon (KR); Ig-kyun Kim, Daejon (KR); Kyung-soo Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 501 days.

This patent is subject to a terminal disclaimer.

(21) Appl. No.: 10/057,670

(22) Filed: Jan. 24, 2002

(65) Prior Publication Data

US 2003/0112872 A1 Jun. 19, 2003

(30) Foreign Application Priority Data

Dec. 15, 2001 (KR) ........................................ 2001-79677

(51) Int. Cl.[7] ................................................ H04B 1/66
(52) U.S. Cl. ............................ 375/240.16; 375/240.12; 375/240.14; 375/240.24; 375/240.26; 375/240.01; 348/699; 382/236; 382/238
(58) Field of Search ...................... 375/240.16, 240.12, 375/240.24, 240.26, 240.01, 240.14; 348/699, 714, 715, 416; 382/236, 238

(56) References Cited

U.S. PATENT DOCUMENTS 5,706,059 A * 1/1998 Ran et al. .............. 375/240.14
6,014,181 A * 1/2000 Sun ........................ 375/240.16
6,567,469 B1 * 5/2003 Rackett ................. 375/240.16

FOREIGN PATENT DOCUMENTS

JP P2000-0045075 7/2000
KR 233764 12/1999

* cited by examiner

Primary Examiner—Shawn S. An
(74) Attorney, Agent, or Firm—Blakely Sokoloff Taylor & Zafman

(57) ABSTRACT

An apparatus and a method for performing mixed motion estimation based on a hierarchical search are provided. In the method, motion vectors of previous image data are received. The median value of the motion vectors is obtained. Current image data is received. Motion of the current image data is compensated for based on the median value of the motion vectors. SAD values of the previous image data are received and the maximum value of the SAD values is obtained. The motion compensation result is compared with the maximum value of the SAD values. Motion estimation of the current image data is skipped and the motion compensation result is output if the motion compensation result is smaller than the maximum value of the SAD values. Motion estimation for the current image data is performed if the motion compensation result is greater than or equal to the maximum value of the SAD values, and the motion estimation result is output.

11 Claims, 5 Drawing Sheets

APPARATUS AND METHOD FOR PERFORMING MIXED MOTION ESTIMATION BASED ON HIERARCHICAL SEARCH

BACKGROUND OF THE INVENTION

1. Field of the Invention

The present invention relates to a design of very large scale integration (VLSI) for realizing an image data compression algorithm with hardware, and more particularly, to an apparatus and a method for performing mixed motion estimation based on a hierarchical search of an image data compression algorithm.

2. Description of the Related Art

In general, image signals are highly correlative with adjacent scenes. Motion estimation has been used in reducing redundant information of an image existing on time axis to increase image compression efficiency. A large number of calculations are necessary for this motion estimation. Also, algorithms and hardware for the calculations have been studied.

FIG. 1 is a block diagram of a motion estimation apparatus 10 based on a hierarchical search according to the prior art. A motion estimation algorithm based on a hierarchical search is disclosed in U.S. Pat. No. 5,706,059, entitled "MOTION ESTIMATION USING A HIERARCHICAL SEARCH", Ran, Jan. 6, 1998. The circuit configuration of the motion estimation apparatus 10 as shown in FIG. 1 is the same as shown in FIG. 2 of U.S. Pat. No. 5,706,059.

Referring to FIG. 1, the motion estimation apparatus 10 includes first and second internal memories 11 and 12, a processing element unit 13, a comparator 14, and an address generator 15.

Describing each of blocks constituting the motion estimation apparatus 10, the first and second internal memories 11 and 12 receive a previous image data and a current image data, respectively, from external memories for a hierarchical search for motion estimation. The processing element unit 13 obtains the differences between absolute values of the previous image data and the current image data. The comparator 14 obtains the minimum motion vector based on the differences obtained from the processing element unit 13. The processing element unit 13 includes five processing elements 131 through 135 to obtain the differences in parallel. The processing element unit 13 has five search regions with respect to the five processing elements 131 through 135. The address generator 15 generates an address of a next stage after the comparator 14 obtains the minimum motion vector.

However, the motion estimation apparatus 10 is realized using additional memories. Thus, there are problems in that the area of the motion estimation apparatus 10 becomes large and power consumption increase. Also, since memories each have different structures, a large number of operations are necessary in motion estimation.

SUMMARY OF THE INVENTION

To solve the above-described problems, it is a first object of the present invention to provide an apparatus and a method for performing motion estimation in which the number of operations necessary for motion estimation is considerably reduced.

It is a second object of the present invention to provide a motion estimation apparatus having small circuit area by considerably reducing the number of operations necessary for motion estimation.

Accordingly, to achieve the objects, there is provided an apparatus for performing motion estimation. The apparatus includes a first memory, a second memory, a motion estimation skip unit, a motion estimation unit, a comparator, a multiplexer, an address generator, and a controller. The first memory stores current image data as a reference block having a predetermined size. The second memory stores previous image data as a search region for searching motion vectors. The motion estimation skip unit receives motion vectors and SAD values of the previous image data, compensates for the motion of the current image data, and determines whether or not motion estimation for the current image data is skipped based on the compensation result of the current image data. The motion estimation unit receives the current image data and the previous image data from the first and second memories to perform motion estimation for the current image data. The comparator outputs the minimum value of estimation results output from the motion estimation unit as a final motion estimation result. The multiplexer selects and outputs any one of the compensation result generated from the motion estimation skip unit and the final estimation result generated from the comparator based on the determination result of the motion estimation skip unit. The address generator outputs addresses related to the motion estimation and the motion compensation to the first and second memories. The controller controls the operation of the motion estimation skip unit and the operation of generating the addresses in the address generator based on the determination of the motion estimation skip unit.

To achieve the objects, there is provided a method of performing motion lo estimation. Motion vectors of previous image data are received. The median value of the motion vectors is obtained. Current image data is received. Motion of the current image data is compensated for based on the median value of the motion vectors. SAD values of the previous image data are received and the maximum value of the SAD values is obtained. The motion compensation result is compared with the maximum value of the SAD values. Motion estimation of the current image data is skipped and the motion compensation result is output if the motion compensation result is smaller than the maximum value of the SAD values. Motion estimation for the current image data is performed if the motion compensation result is greater than or equal to the maximum value of the SAD values, and outputting the motion estimation result.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
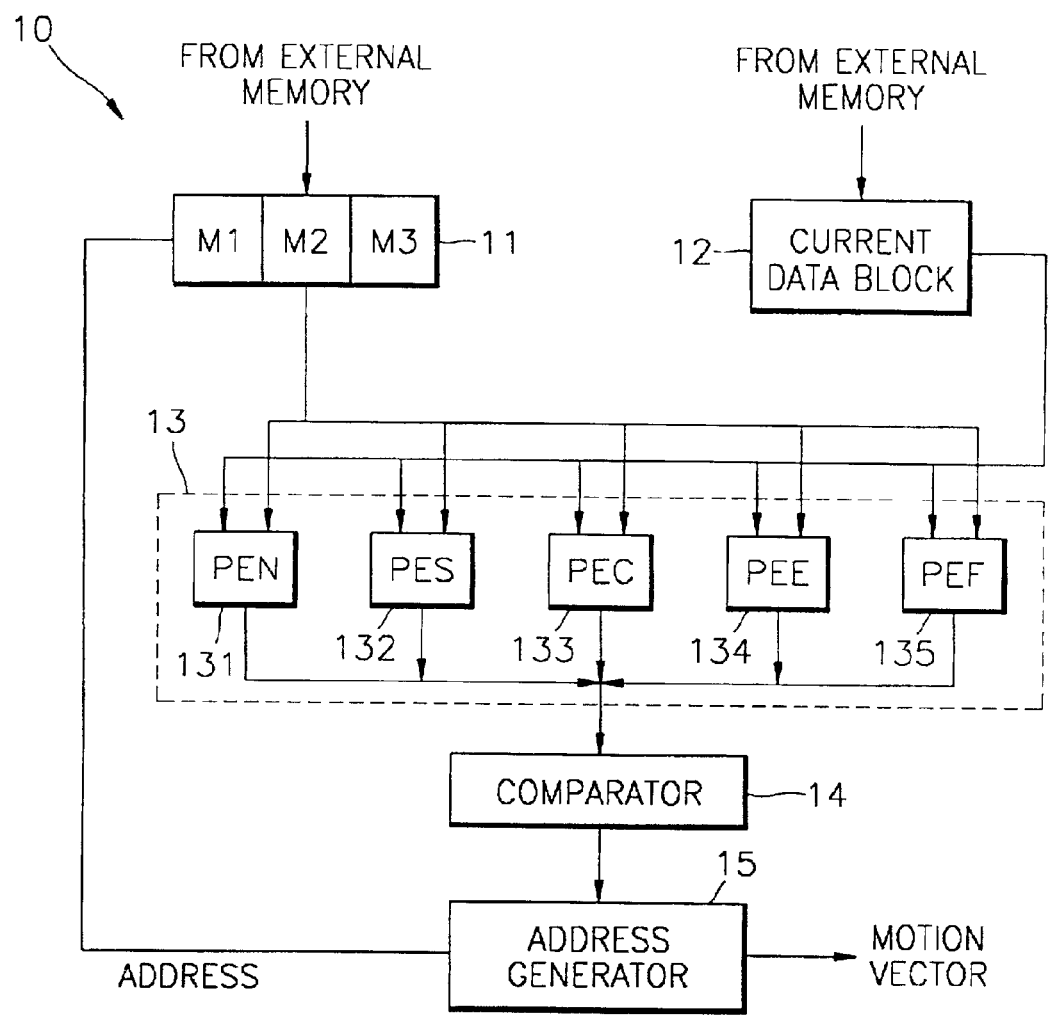
FIG. 1 is a block diagram of an apparatus for performing motion estimation based on a hierarchical search according to the prior art.

Attached drawings for illustrating a preferred embodiment of the present invention, and the contents written on the attached drawings must be referred to in order to gain a sufficient understanding of the merits of the present invention and the operation thereof and the objectives accomplished by the operation of the present invention.

Hereinafter, the present invention will be described in detail by explaining a preferred embodiment of the present invention with reference to the attached drawings. Like reference numerals in the drawings denote the same members.

Figure 2:
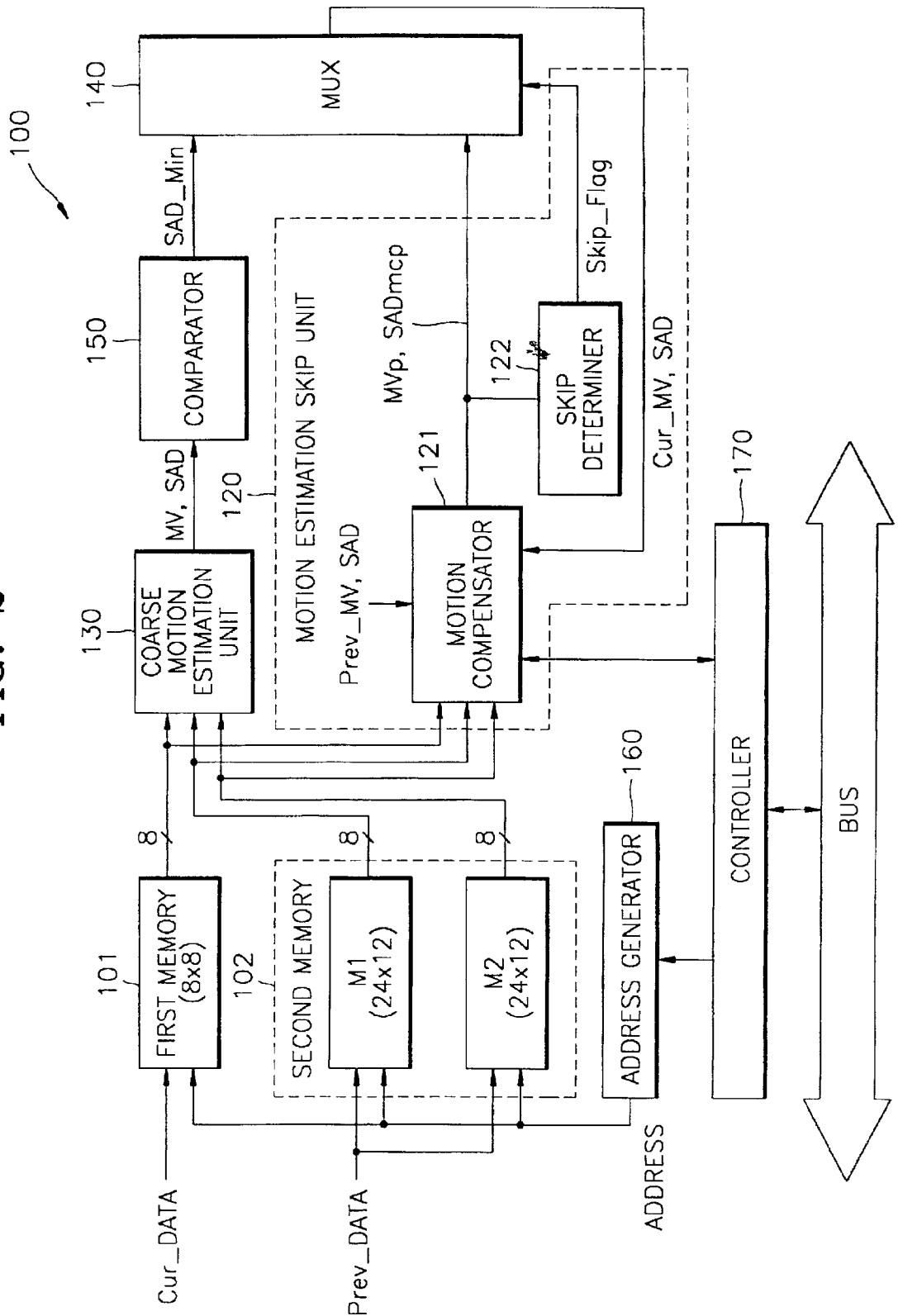
FIG. 2 is a block diagram of an apparatus for performing mixed motion estimation based on a hierarchical search according to a preferred embodiment of the present invention.

FIG. 2 is a block diagram of an apparatus for performing mixed motion estimation based on a hierarchical search according to a preferred embodiment of the present invention. Referring to FIG. 2, the motion estimation apparatus 100 includes first and second memories 101 and 102, a motion estimation skip unit 120, a coarse motion estimation unit 130, a multiplexer 140, a comparator 150, an address generator 160, and a controller 170.

The first memory 101 stores current image data Cur_DATA as a reference block of 8×8 size for obtaining a motion vector MV.

The second memory 102 has two memory blocks M1 and M2 of 24×12 size, which each store data in odd rows and data in even rows of previous image data Prev_DATA. The previous image data Prev_DATA stored in the second memory 102 is used as a search region for searching a motion vector The coarse motion estimation unit 130 receives the current image data Cur_DATA and the previous image data Prev_DATA from the first and second memories 101 and 102, performs a hierarchical search every 2-pixels, and obtains a motion vector MV by 2-pixels. Here, the current image data Cur_DATA and the previous image data Prev_DATA are sub-sampled in the ratio of 2:1 in horizontal and vertical directions. The range of the search is from −8 to +7.

The coarse motion estimation unit 130 includes a PE array (not shown) having a plurality of processing elements PEs. Thus, the coarse motion estimation unit 130 obtains the sum of absolute difference (SAD) values between the previous image data Prev_DATA and the current image data Cur_DATA and outputs the SAD values to the comparator 150. The comparator 150 obtains a minimum SAD value SAD_Min from the input SAD values and outputs the minimum SAD value SAD_Min to the multiplexer 140 as the final motion vector.

Such operation of the coarse motion estimation unit 130 is selectively performed depending on whether or not motion estimation is skipped, which is determined in the motion estimation skip unit 120. Instead of motion estimation requiring a large number of operations, a motion compensation requiring a small number of operations is performed if the motion estimation is skipped. Thus, the number of operations necessary for the whole of the motion estimation apparatus 100 is considerably reduced. The detailed structure and operation of the motion estimation skip unit 120 will be described below.

The motion estimation skip unit 120 includes a motion compensator 121 and a skip determiner 122. The motion compensator 121 has a processing element PE, which receives previous motion vector values Prev_MV and previous SAD values of a previous image, obtains a median value MVp of the previous motion vector values Prev-MV as a predicted motion vector, and performs motion compensation based on the predicted motion vector MVp. Next, the motion compensator 121 generates sum absolute of difference motion compensation prediction (SADmcp) as a result of the motion compensation. Also, the motion compensator 121 obtains the maximum SAD value SADmax from the previous SAD values.

Figure 3:
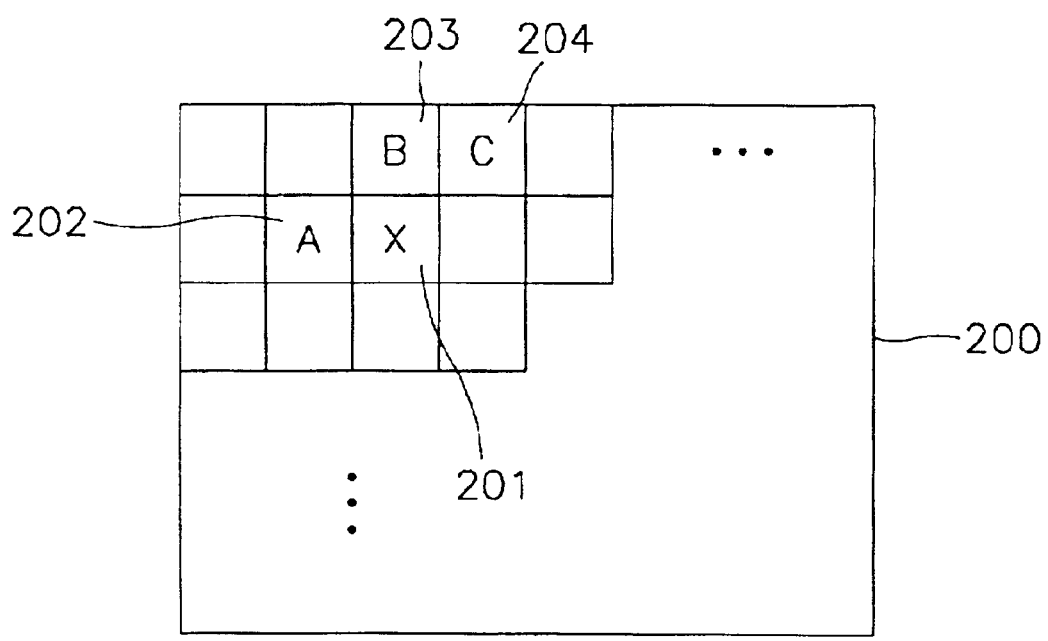
FIG. 3 is a diagram of the configuration of a macro block used in the present invention.

The operations of the motion estimation skip unit 120 are performed in each of macro blocks. FIG. 3 is a diagram of the configuration of macro blocks, each of which has a size of 16×16, according to the present invention. Referring to FIG. 3, the previous motion vector values Prev_MV of the previous image are motion vector values MVa, MVb, and MVc of the macro blocks corresponding to an A position 202, a B position 203, and a C position 204 on the basis of a macro block (MB_X) 201 in an X position. The predicted motion vector MVp is represented by formula 1:

$$MVp = \text{Median}\{MVa, MVb, MVc\} \tag{1}$$

The previous SAD values are motion vectors SADa, SADb, and SADc of the macro blocks corresponding to the A position 202, the B position 203, and the C position 204 on the basis of a macro block (MB_X) 201 in the X position. Here, the maximum SAD value SADmax is represented by formula 2:

$$SAD\,max = \text{Max}\{SADa, SADb, SADc\} \tag{2}$$

For these operations, in the motion estimation apparatus 100 according to the present invention, when an internal module, i.e., the motion estimation skip unit 120 or the motion estimation unit 130, reads 16 bits of data from the macro blocks, data in the search region is sub-sampled in the ratio of 2:1 so that only 8 bits of data are selected from 16 bits of data.

Referring to FIG. 2, the skip determiner 122 receives the motion compensation result SADmcp and the maximum SAD value SADmax from the motion compensator 121 and compares the SADmcp with the SADmax to determine whether or not a motion estimation process for data in a current macro block is skipped. The skip determiner 122 sets an estimation skip flag Skip_Flag based on the determination of the skip of a motion estimation process. For example, if the motion compensation result SADmcp is smaller than the maximum SAD value SADmax, motion estimation for a current image is skipped, i.e., the motion estimation operation is not performed in the motion estimation unit 130. However, the value of the estimation skip flag Skip_Flag is set to "0" or "1" so that only the previously described motion compensation operation is performed. If the motion compensation result SADmcp is greater than or equal to the maximum SAD value SADmax, the value of the estimation skip flag Skip_Flag is set to "1" or "0" so that the motion estimation operation for the current image is performed in the motion estimation unit 130. The skip determiner 122 is constituted as a comparator to perform such operations.

The multiplexer 140 outputs data MV and SAD or MVp and SADmcp transmitted from the motion estimation unit 130 or the motion estimation skip unit 120 as a motion vector Cur_MV and a SAD value of the current image based on the value of the estimation skip flag Skip_Flag set by the skip determiner 122.

The motion vector Cur_MV and the SAD value of the current image output from the multiplexer 140 is input to the motion estimation skip unit 120. The motion estimation skip unit 120 determines whether or not motion estimation for a next image is skipped based on the motion vector Cur_MV and the SAD value of the current image.

The determination of the skip of the motion estimation in the motion estimation skip unit 120 is transmitted to the controller 170. The controller 170 controls the operation of the address generator 160 based on the determination of the skip of the motion estimation in the motion estimation skip unit 120. The controller 170 controls the overall operation of the motion estimation apparatus 100 and interfaces with a Bus.

The address generator 160, controlled by the controller 170, outputs addresses related to the motion estimation and the motion compensation to the first and second memories 101 and 102.

Figure 4:
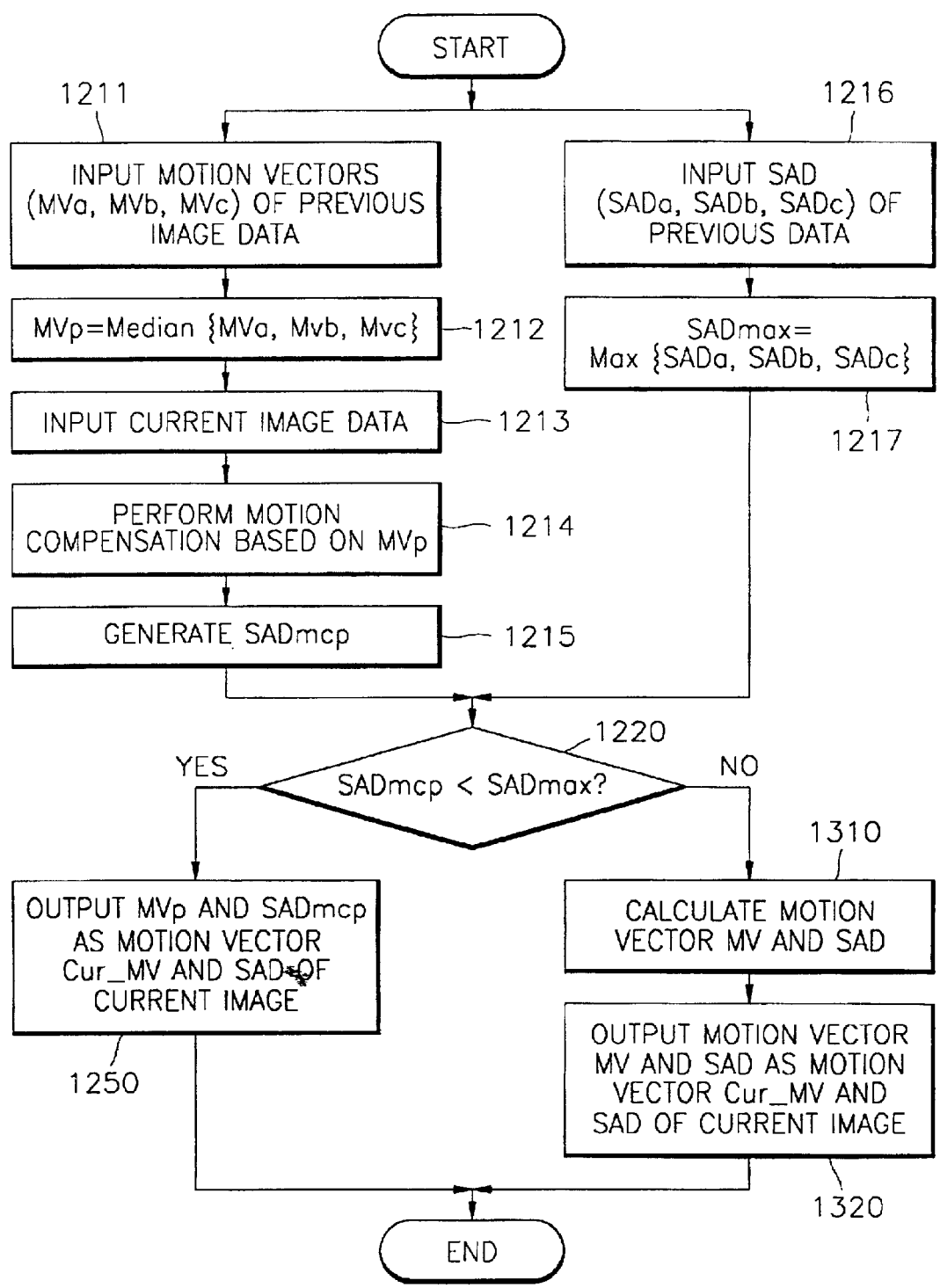
FIG. 4 is a flowchart of steps of performing mixed motion estimation based on a hierarchical search according to the preferred embodiment of the present invention.

FIG. 4 is a flowchart of steps of performing mixed motion estimation based on a hierarchical search according to the preferred embodiment of the present invention Referring to FIG. 4, the motion compensator 121 included in the motion estimation skip unit 120 receives motion vectors MVa, MVb, and MVc of a previous image in step 1211. A median value MVp of the motion vectors MVa, MVb, and MVc is obtained as a predicted motion vector in step 1212. Current image data Cur_DATA is received in step 1213. The motion of the current image is compensated for based on the median value MVp of the motion vectors MVa, MVb, and MVc, which is obtained in step 1212, in step 1214. A SADmcp is generated as the result of the motion compensation in step 1215.

During the steps 1212 through 1215, the motion compensator 121 receives SAD values SADa, SADb, and SADc of the previous image in step 1216, and obtains a maximum SAD value SADmax in step 1217.

The skip determiner 122 included in the motion estimation skip unit 120 compares the motion compensation result SADmcp with the maximum SAD value SADmax in step 1220 to determine whether or not a motion estimation operation is skipped.

If the motion compensation result SADmcp is smaller than the maximum SAD value SADmax in step 1220, the median value MVp of the motion vectors MVa, MVb, and MVc obtained in step 1212 and the motion compensation result SADmcp obtained in step 1215 are output as a motion vector Cur_MV and a SAD value of a current image without an additional motion estimation in step 1250. If the motion compensation result SADmcp is greater than or equal to the maximum SAD value SADmax in step 1220, the motion estimation unit 130 calculates a motion vector MV and a SAD for a current macro block in step 1310. The motion vector MV and the SAD are output as the motion vector Cur_MV and the SAD value of the current image in step 1320.

Figure 5:
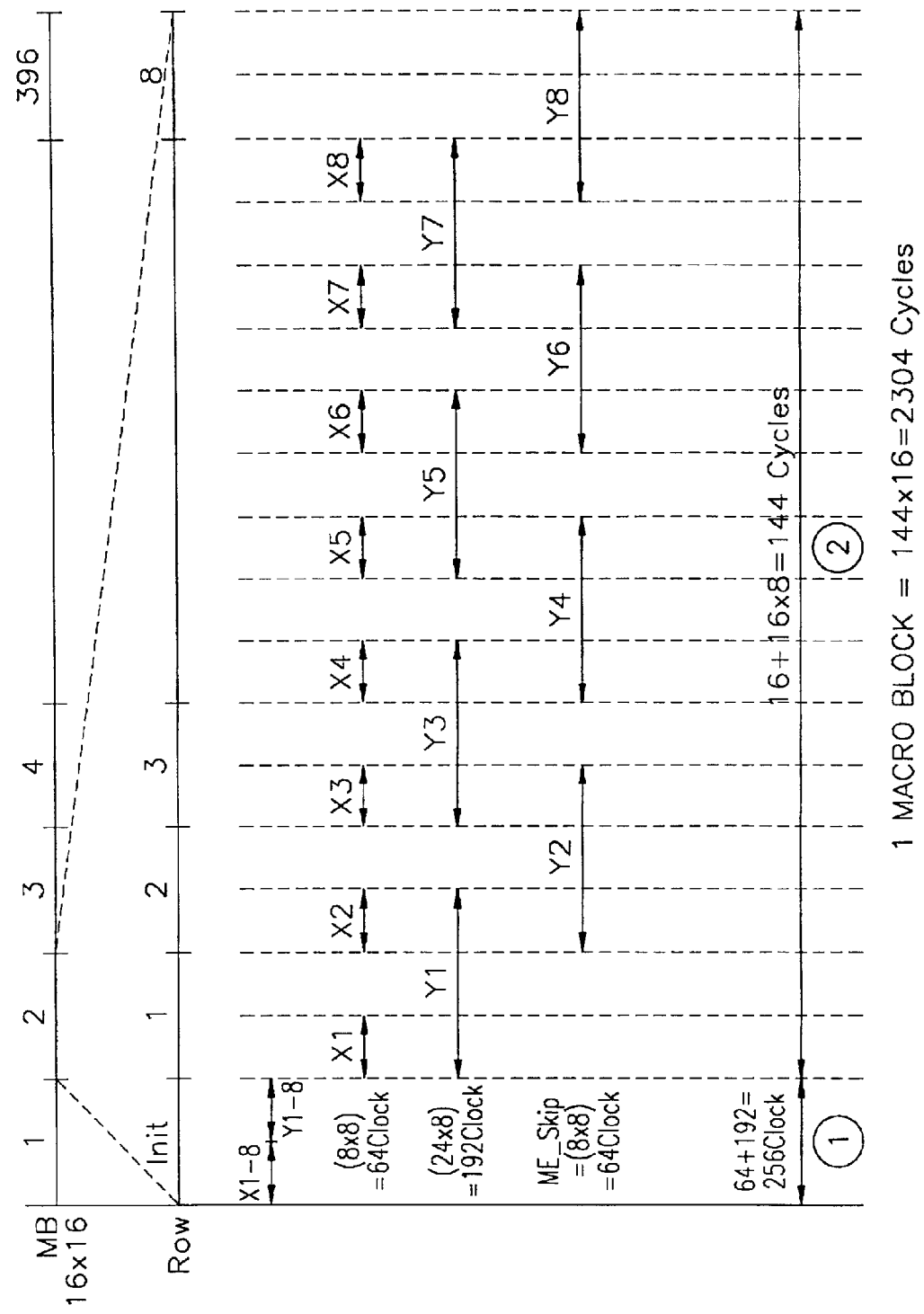
FIG. 5 is a timing diagram showing the number of operations when performing motion estimation using an apparatus and a method for performing mixed motion estimation according to the present invention.

FIG. 5 is a timing diagram showing the number of operations of data when performing motion estimation using an apparatus and a method for performing mixed motion estimation according to the present invention. Here, the number of operations with respect to one macro block is shown. The size of the macro block is 16×16.

Referring to FIG. 5, 8×8=64 clocks are necessary to access a current image and 24×8=192 clocks are necessary to access a previous image. Thus, the total number of clocks necessary for accessing the current image and the previous image is 64+192=256 (Refer to (1) of FIG. 5). In this case, if motion estimation is skipped by the motion estimation skip unit 120, only motion compensation is performed by the motion compensator 121. Thus, 64 clocks are necessary to perform motion compensation in each of macro blocks.

(2) of FIG. 5 represents the number of clocks necessary for processing SAD values, which is performed in the motion estimation unit 130. X1 through X8 represent the number of clocks necessary to input current image data. Y1 through Y8 represent the number of clocks necessary to input previous image data. The motion estimation unit 130 includes eight processing elements. Here, the current image data and the previous image data are alternately input to use the processing elements 100% efficiently. Here, the eight processing elements each require 16 clocks. Thus, the total number of operations amounts to 144 clock cycles by summing the initial 16 clock cycles and the 16 clock cycles of the eight processing elements. These operations are repeated in each of search regions within a range of −8 to +7, i.e., are repeated 16 times. Thus, 2304 clock cycles are required to perform motion estimation. In other words, if the motion estimation is performed in the motion estimation unit 130, 2304 clock cycles are required. Thus, if the motion estimation is skipped in the motion estimation unit 130, the number of operations is reduced by about 70% compared to the case where the motion estimation is performed.

The skip of the motion estimation is applied only to an inter mode. In other words, if macro blocks are positioned on the boundary of an image or peripheral macro blocks are inter lines, the peripheral macro blocks are ineffective. Thus, motion estimation is not skipped in the peripheral macro blocks.

In an apparatus and a method for performing motion compensation according to the present invention, data in a search region is sub-sampled in the ratio of 2:1 so that only 8 bit data is selected from 16 bit data in each of macro blocks. Nevertheless, the picture quality of an image is not deteriorated. This is why the number of bits used in coding motion vector difference (MVD) is reduced and assigned to a Texture to compensate for the deterioration of the picture quality.

As described above, in an apparatus and a method for performing motion estimation, the number of operations necessary for the motion estimation is considerably reduced without the deterioration of the picture quality of an image. Thus, the motion estimation apparatus has a small circuit area.

Also, the present invention can be realized as a computer-readable code recorded on a computer-readable recording medium. The computer-readable recording medium includes all kinds of recording devices for storing computer-readable data. In other words, the computer-readable medium includes ROM, RAM, CD-ROM, magnetic tapes, floppy disks, optical data storing devices, and the like. Also, it is possible realize the computer-readable code in the form of carrier waves, e.g., transmission over the Internet. Moreover, the computer-readable recording medium can be dispersed among computer systems connected to each other via networks.

What is claimed is:

1. An apparatus for performing motion estimation, the apparatus comprising:

a first memory for storing current image data as a reference block having a predetermined size;

a second memory for storing previous image data as a search region for searching motion vectors;

a motion compensator for obtaining the median value of the motion vectors of the previous image data, performing the motion compensation, and obtaining the maximum value of the SAD values;

a skip determiner for comparing the motion compensation result with the maximum value of the SAD values to determine whether or not the motion estimation is skipped;

a motion estimation unit for receiving the current image data and the previous image data from the first and second memories to perform motion estimation for the current image data;

a comparator for outputting the minimum value of estimation results output from the motion estimation unit as a final motion estimation result;

a multiplexer for selecting and outputting any one of the compensation result generated from the motion compensator and the final estimation result generated from the comparator based on the determination result of the skip determiner;

an address generator for outputting addresses related to the motion estimation and the motion compensation to the first and second memories; and a controller for controlling the operation of the motion compensator and the skip determiner and the operation of generating the addresses in the address generator based on the determination of the skip determiner.

2. The apparatus of claim 1, wherein the motion compensator comprises a processing element for performing motion estimation of the current image data.

3. The apparatus of claim 1, wherein the skip determiner is constituted as a comparator for comparing the motion compensation result with the maximum value of the SAD values.

4. The apparatus of claim 1, wherein if the motion compensation result is smaller than the maximum value of the SAD values, the skip determiner sets the value of an estimation skip flag so that the motion estimation is skipped and the motion compensation is performed, and if the motion compensation result is greater than or equal to the maximum value of the SAD values, the skip determiner sets the value of the estimation skip flag so that the motion estimation is performed.

5. The apparatus of claim 4, wherein the multiplexer receives the value of the estimation skip flag as a signal for selecting any one of the estimation compensation result generated from the motion estimation skip unit and the motion estimation result generated from the motion estimation unit.

6. The apparatus of claim 1, wherein operations related to the motion compensation and the motion estimation are performed in each of macro blocks.

7. The apparatus of claim 6, wherein the motion estimation unit sub-samples data in the search region in the ratio of 2:1 so that only half of a bit of data is selected from each line of the macro block.

8. The apparatus of claim 6, wherein the macro blocks used in operations related to motion estimation and motion compensation are each positioned on the left side of the reference block, on the reference block, and on the right-and-up side of the reference block.

9. The apparatus of claim 1, wherein the motion estimation unit comprises a plurality of processing elements for estimating a motion of the current image data.

10. A method of performing motion estimation, the method comprising:

(a) receiving motion vectors of previous image data;

(b) obtaining the median value of the motion vectors;

(c) receiving current image data;

(d) compensating for motion of the current image data based on the median value of the motion vectors;

(e) receiving SAD values of the previous image data and obtaining the maximum value of the SAD values;

(f) comparing the motion compensation result with the maximum value of the SAD values;

(g) skipping motion estimation of the current image data and outputting the motion compensation result if the motion compensation result is smaller than the maximum value of the SAD values in step (f); and (h) performing motion estimation for the current image data if the motion compensation result is greater than or equal to the maximum value of the SAD values in step (f), and outputting the motion estimation result.

11. A computer-readable recording medium for storing a program for executing the method of claim 10.

* * * * *